(12) United States Patent
Cauffriez et al.

(10) Patent No.: US 6,451,199 B1
(45) Date of Patent: Sep. 17, 2002

(54) HOMOGENEOUS CATALYST BED AND PROCESS OF TRANSFORMING HYDROCARBONS INTO AROMATIC COMPOUNDS WITH THE BED

(75) Inventors: Hervé Cauffriez, Bougival; Fabienne Le Peltier; Elisabeth Rosenberg, both of Rueil-Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/499,698

(22) Filed: Feb. 8, 2000

(30) Foreign Application Priority Data

Feb. 9, 1999 (FR) .............................. 99 01480

(51) Int. Cl.⁷ ...................... C10G 35/085; C07C 15/00; B01J 23/40
(52) U.S. Cl. ......................... 208/139; 208/134; 208/135; 208/136; 208/137; 208/138; 585/407; 502/305; 502/308; 502/310; 502/319; 502/321; 502/322; 502/323; 502/325; 502/326; 502/327; 502/334; 502/339; 502/349; 502/355
(58) Field of Search ................................ 208/134, 135, 208/136, 137, 138, 139; 502/305, 308, 310, 319, 321, 322, 323, 325, 326, 327, 334, 339, 349, 355; 585/407

(56) References Cited

U.S. PATENT DOCUMENTS

| | | | | |
|---|---|---|---|---|
| 3,969,221 A | * | 7/1976 | Mitchell et al. ............ | 208/138 |
| 4,020,012 A | * | 4/1977 | Miura et al. ................ | 502/227 |
| 4,256,566 A | | 3/1981 | Antos .......................... | 208/139 |
| 4,487,848 A | | 12/1984 | Robinson et al. ........... | 502/223 |
| 4,714,540 A | * | 12/1987 | Moser et al. ................ | 208/139 |
| 5,106,809 A | | 4/1992 | Baird, Jr. et al. ............ | 502/223 |
| 5,166,121 A | | 11/1992 | Khare et al. ................ | 502/225 |

FOREIGN PATENT DOCUMENTS

| | | |
|---|---|---|
| EP | 0 512 766 | 11/1992 |
| FR | 2 770 420 | 5/1999 |

* cited by examiner

Primary Examiner—Walter D. Griffin
(74) Attorney, Agent, or Firm—Millen, White, Zelano & Branigan, P.C.

(57) ABSTRACT

For transforming hydrocarbons into aromatic compounds, the reaction is conducted on a homogeneous bed of catalyst particles, said catalyst comprising at least one amorphous matrix, at least one noble metal, at least two additional metals M1 and M2 and at least one halogen, and in which, for a catalyst particle, $C_{pt}$ is the local concentration of platinum; $C_{M1}$ is the local concentration of additional metal M1; $C_{M2}$ is the local concentration of additional metal M2; in which the standard deviation of the distribution of the local ratios of the concentrations of the additional metals, $C_{M1}/C_{M2}$, measured along the particle diameter, is better than 25% relative.

16 Claims, No Drawings

HOMOGENEOUS CATALYST BED AND PROCESS OF TRANSFORMING HYDROCARBONS INTO AROMATIC COMPOUNDS WITH THE BED

The present invention relates to a homogeneous catalyst bed with improved trimetallic and bifunctional effects, the catalyst particles having reduced local fluctuations in composition, resulting in greatly improved catalytic performances in particular, and in improved activities and gasoline yields. Such a bed is termed "homogeneous on the micronic scale". The invention also relates to a process for transforming hydrocarbons to aromatic compounds using the catalyst, such as the gasoline reforming process and the aromatic compound production process.

Catalysts for gasoline reforming and/or aromatic compound production are well known. They generally contain a matrix, at least one noble metal from the platinum family, at least one halogen and at least one promoter metal, also known as an additional metal.

Promoter metals particularly include tin for regenerative processes and rhenium for fixed bed processes. Frequently, a second promoter is used, for example tungsten for regenerative processes (Pt, Sn, W) and indium for fixed bed processes (Pt, Re, In).

Catalysts for gasoline reforming and/or for aromatic compound production are bifunctional catalysts with two functions which are essential for producing the correct performances: a hydrodehydrogenating function which dehydrogenates naphthenes and hydrogenates coke precursors, and an acid function which ensures isomerisation of naphthenes and paraffins and ring closure of long chain paraffins. The hydrodehydrogenating function can be provided by an oxide such as molybdenum oxide $MoO_3$, chromium oxide $Cr_2O_3$ or gallium oxide $Ga_2O_3$, or by a metal from column 10 (Ni, Pd, Pt). It is known that metals, in particular platinum, are much more active than oxide phases for hydrodehydrogenation reactions, and for this reason metallic catalysts have replaced supported oxide catalysts for reforming gasoline and/or for aromatic compound production. However, metals such as Ni, and to a lesser extent palladium and platinum, also have a hydrogenolysing activity to the detriment of the desired gasoline yield for gasoline reforming and/or for aromatic compound production. This hydrogenolysing activity can be substantially reduced, and thus the catalyst selectivity can be increased, by adding a second metal such as tin. Further, adding a second metal such as iridium or rhenium increases the hydrogenating properties of platinum, which encourages hydrogenation of coke precursors and thus enhances the stability of the catalyst. These various reasons have encouraged the success of bimetallic catalysts over first generation monometallic catalysts. More recently, trimetallic catalysts have been introduced, which retain the improved stability of bimetallic catalysts by increasing the gasoline selectivities of these catalysts.

An increase in selectivity can thus be achieved by various means. Prior art document U.S. Pat. No. 5,128,300 recommends, for catalyst extrudates, a homogeneous distribution of tin with a local composition which does not fluctuate by more than 25% about the average tin content, this being 0.1–2% by weight of catalyst.

We have discovered, and this constitutes the subject matter of the present invention, that the performance of the catalyst can be substantially improved not only by limiting the variation in a single element, but by controlling the relative fluctuations of the ratio of the compositions of the different promoters. Thus homogeneity of the trimetallic (noble—promoter metals) effect is attained in the particle bed, which improves the overall performances of the process for which the catalyst is used.

More precisely, the invention concerns a homogeneous bed of catalyst particles, said catalyst comprising at least one amorphous matrix, at least one noble metal from the platinum family, at least two additional metals M1 and M2 and at least one halogen, and in which, for a catalyst particle, $C_{pt}$ is the local concentration of platinum, $C_{M1}$ is the local concentration of additional metal M1, $C_{M2}$ is the local concentration of additional metal M2, in which catalyst particle bed the standard deviation of the distribution of ratios $C_{M1}/C_{M2}$, measured along the particle diameter, is better than 25% relative.

The amorphous catalyst matrix is generally a refractory oxide such as magnesium, titanium or zirconium oxides, alumina or silica, used alone or as a mixture. The preferred support contains alumina or is constituted by alumina.

For gasoline reforming and/or aromatic compound production reactions, the preferred matrix is alumina, and advantageously its specific surface area is 50–600 m$^2$/g, preferably 150–400 M$^2$/g.

The catalyst also contains at least one noble metal from the platinum family (Pt, Pd, Rh. Ir), preferably platinum. Advantageously, the catalyst can contain a noble metal (such as Pt).

Additional metals M1 and M2 are selected from the group formed by tin, germanium, lead, gallium, indium, thallium, rhenium, iridium, manganese, chromium, molybdenum and tungsten. With gasoline reforming and/or regenerative aromatic compound production processes carried out in a moving bed, the preferred metal is tin, and very advantageously it is combined with platinum (catalysts containing Pt, Sn) and still more advantageously, the catalyst also contains tungsten or iridium (catalysts containing Pt, Sn, W or containing Pt, Sn, Ir or containing Pt, Sn, W, Ir or containing Pt, Sn, In or containing Pt, Ir, In).

In fixed bed processes, the preferred metal is rhenium; highly advantageously it is combined with platinum (catalysts containing Pt, Re) and more advantageously the catalyst contains indium (catalysts containing Pt, Re, In), further, tungsten or iridium can be present (catalysts containing Pt, Re, W or Pt, Re, In, W or Pt, Re, Ir or Pt, Re, In, Ir). These catalysts are usually and preferably sulphurised before or after loading up.

The halogen is selected from the group formed by fluorine, chlorine, bromine and iodine, preferably chlorine.

The catalyst generally contains 0.02% to 2% by weight, preferably 0.04% to 2% by weight of a noble metal, 0.1% to 15% of halogen and 0.02% to 10%, preferably 0.04% to 10%, of additional metal M1 and 0.02%10% to 10%, preferably 0.04% to 10% of additional metal M2. Preferably, the catalyst of the invention contains at most 2% of additional metal M1 and at most 2% of additional metal M2. Under these preferred conditions, the catalyst has the best performances due to an optimised trimetallic effect.

The catalyst is in the bed in the form of particles which can be beads, extrudates, trilobes or any of the forms usually employed.

$C_{pt}$ is the local concentration of noble metal, expressed in atoms/unit of measurement (the noble metal is not necessarily platinum), $C_{M1}$ is the local atomic concentration of additional metal M1, $C_{M2}$ is the local atomic concentration of additional metal M2 and $C_x$ is the local atomic concentration of halogen.

The overall catalyst composition can be determined by X ray fluorescence using the catalyst in the powdered state, or by atomic absorption of the catalyst after acid attack.

The local composition measured on the micronic scale as opposed to the overall composition of the catalyst can be measured using an electron microprobe and can be completely evaluated by STEM (Scanning Transmission Electron Microscopy). This measurement can be made by determining the platinum and additional metal contents in zones of a few cubic microns along the diameter of a catalyst particle which are termed the measurement units. This measurement enables the macroscopic distribution of the metals to be determined inside the particles, more exactly, it constitutes an elemental analysis on the micronic scale.

The analyses were carried out using a JEOL JXA 8800 electron microprobe or using a Microbeam type CAMEBAX, equipped with wavelength-dispersive spectrometers. The particles were coated in resin then polished to their diameter. The acquisition parameters were as follows: acceleration voltage 20 kV, current 30 nA, Pt L$\alpha$, Sn L$\alpha$, Cl K$\alpha$ lines and count time 20 s.

The term "diameter" does not solely refer to a bead or extrudate shape, but more generally to any form of particle; the term "diameter" is used for the representative length of the particle on which the measurement is carried out.

Thus from local measurements of $C_{M1}$ and $C_{M2}$ (i.e., at a set position on the particle diameter), the local ratio $C_{M1}/C_{M2}$ can be calculated.

The measurements were carried out on a representative sample of the bed or the catalyst batch to be used for a catalytic bed, uniformly distributed along the particle diameter.

In accordance with the invention, the mathematical standard deviation of the distribution of local ratios $C_{M1}/C_{M2}$ for the bed of catalyst particles is better than 25%. Preferably, the standard deviation for the distribution of local ratios $C_{M1}/C_{M2}$ is better than 20%, 15%, or even 10%.

Thus at any point of the catalyst, a variation in the amount of element M1 is accompanied by a controlled variation in the amount of element M2, such that the ratio M1/M2 remains within the optimum range. This approach enables the "trimetallic effect" to be properly expressed.

The trimetallic effect corresponds to the quality of the interaction between promoters M1 and M2, which effect establishes the performance of the catalyst.

There is frequently an optimum $C_{M1}/C_{M2}$ atomic ratio below which the "trimetallic effect" is less pronounced and above which the activity of the catalyst is reduced by an excess of additional metal. Such an optimum is also observed in the case of bimetallic catalysts, between the noble metal and the metal M. IN order to reap the full benefit of the trimetallic effect resulting from adding one or more additional metals, it is important that the ratio $C_{M1}/C_{M2}$, measured locally on each catalyst particle, is also as close as possible to and also varies as little as possible about an optimum value.

A further parameter which is very important for the catalytic performances of catalysts, in particular those used for gasoline reforming and/or aromatic compound production, is the halogen (chlorine) content, in particular the local halogen concentration with respect to the local concentration of noble metal. This involves a bifunctional metal-acid effect.

The halogen (chlorine) is responsible for the acid function of catalysts which assume isomerisation and ring closure of $C_6$–$C_{11}$ paraffins. For each catalyst there exists an optimum halogen (chlorine) content. For chlorine contents below this optimum content, the catalysts suffer from a lack of activity in particular as regards dehydrocyclisation of $P_7$–$P_9$ paraffins. For chlorine contents which are over this optimum content, the catalysts have an excessive cracking activity resulting in the production of large amounts of $C_3$–$C_4$ fuel gas, and thus a drop in gasoline yields. The optimum chlorine concentration depends on the nature of the support, its specific surface area and its structure. It is usually close to 1.0% by weight in commercial catalysts but can be significantly lower or higher than this value for certain particular supports, or in the presence of doping elements such as silicon included in the support.

It is also important to prepare catalysts with different core and periphery concentrations of $C_{pt}$, $C_{M1}$ or $C_{M2}$. These catalysts have "bowl" or "domed" distribution profiles. These catalysts, with bowl or domed $C_{pt}$, $C_{M1}$ or $C_{M2}$ concentrations, are important for some applications where diffusion rate effects are required for the reactants or products in the catalyst.

In this case, the values $C_{pt}$, $C_{M1}$ or $C_{M2}$ vary as a function of the particle diameter. In accordance with the invention, promoters M1 and M2 have similar distribution curves, i.e., the ratio $C_{M1}/C_{M2}$ remains constant, characterized in that the standard deviation of the distribution of local ratios $C_{M1}/C_{M2}$ is better than 25%.

A further distribution type is the "shell" where the noble metal and/or metals M (M1 and M2) are distributed at the surface, and in particular the noble metal is in a shell or is uniformly distributed and metals M are uniformly distributed or in a shell. As an example, at least 40%, preferably at least 50% of the noble metal is concentrated in a 50 $\mu$m to 100 $\mu$m thick shell (measured from the particle periphery). Preferably, the concentration of noble metal in the shell (and advantageously in the 50 $\mu$m thick shell) is 5 times higher than in the core, the core corresponding to the central zone with a diameter of 50% of the particle diameter (for an extrudate, this is the cylinder diameter).

In general, the core/edge ratio of concentrations $C_{pt}$, $C_{M1}$ or $C_{M2}$ at the core and the periphery of the catalyst particles can be in the range 0.1 to 5.

A further type of distribution is a bowl distribution where the noble metal and/or metals M (M1 and M2) are distributed in a bowl shape, and in particular the noble metal is in a bowl distribution or uniformly distributed and the metals are in a bowl distribution.

In a preferred variation, the catalyst contains at least two metals M1 and M2 and the noble metal (Pt is preferred) is uniformly distributed through all of the catalyst.

In a further possibility, the catalyst contains at least two metals M1 and M2 uniformly distributed throughout the catalyst, the noble metal being in a bowl distribution.

Advantageously in the case cited above, metal M1 is rhenium and metal M2 is indium.

Highly preferably, the catalyst contains at least two metals M1 and M2 which are uniformly distributed, the noble metal also being uniformly distributed in the catalyst particle.

In one technique of the invention, the catalyst is obtained by impregnating an aqueous or organic solution of at least one compound of said metal M1, the volume of the solution preferably being equal to the retention volume of the support or in excess with respect to that volume. The solid and the impregnation solution are left in contact for several hours. The solid is then washed and filtered. The solid is then impregnated with an aqueous or organic solution of at least one compound of said metal M2, the volume of the solution preferably being equal to the retention volume of the support or in excess with respect to that volume. The solid and the impregnation solution are left in contact for several hours. The solid is then washed and filtered. The solid obtained is then impregnated with an aqueous or organic solution of at least one compound of a group VIII metal, the volume of the solution preferably being in excess with respect to the retention volume of the support or equal to that volume. After several hours of contact, the product obtained is dried then calcined in air between 300° C. and 600° C., preferably in a stream of air for several hours. The order of the steps for impregnating M1, M2 and the noble metal can be reversed.

The metals can also be introduced using any of the techniques known to the skilled person. Metals M1 and/or M2 can also be introduced during any of the catalyst manufacturing steps, for example during alumina synthesis using a sol-gel technique (co-precipitation) or when forming the catalyst (extrusion, oil-drop . . . ).

In accordance with the invention, the catalyst described above is used in gasoline reforming and aromatic compound production processes. Reforming processes can increase the octane number of gasoline fractions originating from the crude oil distillation and/or from other refining processes. Aromatic compound production processes provide bases (benzene, toluene and xylenes) for use in petrochemistry. These processes have a supplemental importance by contributing to the production of large quantities of hydrogen which is vital for hydrogenation and hydrotreatment processes in the refinery. These two processes are distinguished from each other in their choice of operating conditions and in the composition of the feed, as is known to the skilled person.

In general, the typical feed treated by these processes contains paraffinic, naphthenic and aromatic hydrocarbons containing 5 to 12 carbon atoms per molecule. This feed is defined, inter alia, by its density and its composition by weight. This feed is brought into contact with the catalyst of the present invention at a temperature in the range 400° C. to 700° C. The mass flow rate of the treated feed per unit mass of catalyst can be in the range 0.1 to 10 kg/kg/h. The operating pressure can be fixed between atmospheric pressure and 4 MPa. A portion of the hydrogen produced is recycled in a molar recycle ratio in the range 0.1 to 10. This ratio is the mole ratio of the recycled hydrogen flow rate to the feed flow rate.

The following examples illustrate the invention without limiting its scope.

EXAMPLE 1

(Not in Accordance with the Invention)

Catalyst A was a trimetallic Pt-Re-In catalyst comprising 0.25% by weight of platinum, 0.3% by weight of rhenium, 600 ppm of indium and 1.1% by weight of chlorine. The support was a γ alumina with a specific surface area of 210 m² per gram. 500 cm³ of a solution of indium nitrate was added to 100 g of support, left in contact for 3 hours then drained. The solid was brought into contact with 500 cm³ of an ammonium perrhenate solution, left in contact for 3 hours then drained. The solid was brought into contact with 500 cm³ of a hexachloroplatinic acid solution, left in contact for 3 hours then dried for 1 hour at 120° C. and calcined for 2 hours at 500° C.

Catalyst A had a homogeneous rhenium (M1) distribution and a non homogeneous indium (M2) distribution. In this case the observed standard deviation of the ratio $C_{M1}/C_{M2}$ over 100 measurements was 29%. Catalyst A was not in accordance with the invention.

EXAMPLE 2

(In Accordance with the Invention)

Catalyst B was a trimetallic Pt-Re-In catalyst comprising 0.25% by weight of platinum, 0.3 % by weight of rhenium, 600 ppm of indium and 1.1% by weight of chlorine. The support was a γ alumina with a specific surface area of 210 m² per gram. 500 cm³ of a solution containing indium nitrate and 10% by weight of hydrochloric acid was added to 100 g of support, left in contact for 3 hours then drained. The solid was brought into contact with 500 cm³ of an ammonium perrhenate solution, left in contact for 3 hours then drained. The solid was brought into contact with 500 cm³ of a hexachloroplatinic acid solution, left in contact for 3 hours then dried for 1 hour at 120° C. and calcined for 2 hours at 500° C.

Catalyst B had a homogeneous rhenium (M1) distribution and a homogeneous indium (M2) distribution. In this case the observed standard deviation of the ratio $C_{M1}/C_{M2}$ over 100 measurements was 10.5%. Catalyst B was in accordance with the invention.

EXAMPLE 3

Samples of catalysts A and B, the preparations for which were described above, were tested by transforming a feed with the following characteristics:

| | |
|---|---|
| Density at 20° C. | 0.753 kg/dm³ |
| Research octane number | ~60 |
| Paraffin content | 49.4 volume % |
| Naphthene content | 35.1 volume % |
| Aromatic compound content | 15.5 volume % |

This transformation was carried out in the presence of hydrogen under the following operating conditions:

| | |
|---|---|
| Temperature | 500° C. |
| Total pressure | 0.70 MPa |
| Feed flow rate | 3.3 kg per kg of catalyst |

Before injecting the feed, the catalysts were activated at high temperature in hydrogen for 2 hours. The catalysts were then sulphurised using dimethyldisulphide in hydrogen for 2 hours. The performances obtained for an iso-octane number of 102 are shown in the Table below.

| Sample | Reformate yield (wt %) | Research octane number | Aromatic compound yield (wt %) | C4- yield (wt %) |
|---|---|---|---|---|
| A | 86.4 | 102 | 69.1 | 9.9 |
| B | 87.9 | 102 | 71.3 | 8.2 |

The quantity of reformate produced by catalyst B at iso-octane was substantially higher than for catalyst A.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/01.480, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A homogeneous bed of catalyst particles, said catalyst comprising at least one amorphous matrix, at least one noble metal, at least two additional metals M1 and M2 and at least one halogen, and in which, for a catalyst particle, $C_{pt}$ is the local concentration of noble metal;

$C_{M1}$ is the local concentration of additional metal M1;

$C_{M2}$ is the local concentration of additional metal M2, in which the standard deviation of the distribution of the local ratios of the concentrations of the additional metals, $C_{M1}/C_{M2}$, measured along the particle diameter, is better than 25% relative.

2. A bed according to claim 1, in which the standard deviation is better than 20% relative.

3. A bed according to claim 1, in which the standard deviation is better than 15% relative.

4. A catalyst according to claim 1, comprising 0.02–2% by weight of noble metal, 0.02% to 10% by weight of metal M1, 0.02% to 10% by weight of metal M2 and 0.1% to 15% by weight of halogen.

5. A catalyst according to claim 3, comprising 0.04% to 2% by weight of noble metal, 0.04% to 2% by weight of metal M1, 0.04% to 2% by weight of metal M2 and 0.1% to 15% by weight of halogen.

6. A catalyst according to claim 1, wherein the noble metal is platinum and the halogen is chlorine.

7. A catalyst according to claim 1, wherein the additional metal M1 and M2 are selected from the group consisting of tin, germanium, lead, gallium, indium, thallium, rhenium, iridium, manganese, chromium, molybdenum and tungsten.

8. A catalyst according to claim 1, selected from the group consisting of catalysts containing Pt, Re, In, catalysts containing Pt, Re, W, catalysts containing Pt, Re, In, W, catalysts containing Pt, Re, Ir and catalysts containing Pt, Re, In, Ir.

9. A catalyst according to claim 1, selected from the group consisting of catalysts containing Pt, Sn, W, catalysts containing Pt, Sn, Ir and catalysts containing Pt, Sn, W, Ir or catalysts containing Pt, Sn, In and catalysts containing Pt, Ir, In.

10. A catalyst according to claim 1, having a ratio between the concentrations $C_{pt}$ or $C_{M1}$ or $C_{M2}$ in the catalyst core and the respective concentrations $C_{pt}$ or $C_{M1}$ or $C_{M2}$ at the catalyst periphery of 0.1 to 5.

11. A catalyst according to claim 1, wherein at least two additional metals M1, M2 are uniformly distributed throughout the catalyst, the noble metal also being uniformly distributed through the catalyst particle.

12. A catalyst according to claim 1, wherein at least two additional metals M1, M2 are uniformly distributed throughout the catalyst, the noble metal being distributed in a "bowl" profile.

13. A catalyst according to claim 1, wherein at least two additional metals M1, M2 are uniformly distributed throughout the catalyst, the noble metal being distributed as a "shell".

14. A catalyst according to claim 1, wherein at least two additional metals M1, M2 are distributed in a bowl profile.

15. In a process for catalytically transforming hydrocarbons to aromatic compounds, the improvement wherein the catalyst is according to claim 1.

16. A process according to claim 15 for reforming, gasoline.

* * * * *